June 2, 1970  D. E. CLIZBE ET AL  3,515,923
DYNAMOELECTRIC MACHINE AND CORRUGATED
PLASTIC SLOT LINER INSERT THEREFOR
Filed April 4, 1969

INVENTORS
DAVID E. CLIZBE
JOHN A. CROWELL

BY Hoger T. Sutherland

ATTORNEY 3,515,923
DYNAMOELECTRIC MACHINE AND CORRUGATED PLASTIC SLOT LINER INSERT THEREFOR
David E. Clizbe, Hockessin, and John A. Crowell, Wilmington, Del., assignors to E. I. du Pont de Nemours and Company, Wilmington, Del., a corporation of Delaware
Filed Apr. 4, 1969, Ser. No. 813,530
Int. Cl. H02k 3/36
U.S. Cl. 310—215                             3 Claims

ABSTRACT OF THE DISCLOSURE

Dynamoelectric machine including a core having slots therein for receiving coil windings and a slot lining insert for each slot, the insert being substantially U-shaped and made of relatively heavy corrugated plastic film or board such as polyethylene terephthalate of the order of from 5 to 20 mils thick prior to corrugating and having good dielectric strength and mechanical strength, electrical stability, low moisture sensitivity and other properties, the corrugations and strength of the insert providing cushioning and insulation for the coil windings wound in the slots while occupying very little space in such slots.

Such corrugated slot lining insert may have a space-volume ratio (i.e., the difference between the insert thickness before corrugating and the insert thickness after corrugating divided by such insert thickness after corrugating) of from 0.20 to 0.60 and a repeat distance between the crests of successive corrugations of less than the width of an individual coil winding.

BACKGROUND OF THE INVENTION

Field of the invention

This invention is a dynamoelectric machine and, more particularly, is directed to the use of a slot lining insert as insulation in such machine made of relatively heavy, rigid, corrugated plastic film or board, such as polyethylene terephthalate film or board.

Description of the prior art

The use of plastic film, such as polyester film as insulation in dynamoelectric machines is old in the art, particularly in the small integral horsepower units and in the fractional horsepower units. The polyester film is inserted as slot and phase insulation in the stators and rotors of these machines to isolate the coil windings from the ground in the metal lamina of the core and to separate sets of windings one from another. Polyester film, such as polyethylene terephthalate film available commercially under the trademark "Mylar®", owned by E. I. du Pont de Nemours and Company, is particularly effective as slot insulation.

The insulation must provide electrical and physical separation of wire and core not only in the finished state but must withstand the rigors of the winding process and the stresses resulting from heat and other factors during operation. In order to meet these requirements it has been necessary to use very thick films which far exceed the electrical requirements and that occupy valuable space within the slots.

U.S. Pat. 3,210,583 to Profitt et al. shows the use of a notched flat, polyester film as a slot insulation lining means in a typical example of the prior art teachings.

Further, plastic film of this type (i.e., "Mylar" film) which has been corrugated, has been previously used as cable wrap, as shown, for example, in U.S. Pat. 3,244,799 to Roberts.

Such corrugated "Mylar" polyester film provides an improved lower cost thermal barrier for telephone cable while maintaining the familiar excellent abrasion resistance, puncture resistance, high melting point, chemical resistance and dielectric strength properties of such film. Through the use of corrugated "Mylar" film this excellent balance of properties continues to aid cable manufacturers in lowering reject rates and manufacturing costs while maintaining high reliability in the finished cable.

In cable wrapping applications the films used are relatively thin (2 to 3 mils thick prior to corrugating, for example) and are corrugated under heat and pressure in the lengthwise or machine direction of the film to a corrugated thickness of around 9½ mils. The base film is elongated in this process which reduces the thickness by about 10%. This thin film is not suitable for slot insulation as it lacks the required dielectric strength in this particular use application. Further, it lacks the mechanical strength to prevent crushing of the corrugations during the winding of the core windings thereupon and to avoid damage, cut through, at the slot edges during winding. One purpose of the corrugations in cable wrap film is to provide as much air space as possible to improve thermal insulation. In slot lining applications, space is at a premium and these thin films with their large air spaces are unsuitable for this purpose.

SUMMARY OF THE INVENTION

This invention is a slot lining insert for a dynamoelectric machine having a core with slots therein made from relatively heavy corrugated film or board for providing improved cushioning and other requirements for core windings wound in the slots.

Briefly described, the slot lining insert of this invention is a stiff corrugated material of suitable plastic film or board, such as polyester film, having good insulating and cushioning properties and other desired characteristics. The insert is bent into a generally U-shaped configuration and inserted into a slot in the machine after which the core windings are wound in the slots, from one slot to the other and, hence, into cushioning and insulating contact with the slot lining inserts.

The principal function of insulation in dynamoelectric machines is to insulate the coil windings from each other (winding insulation), to insulate the coils from each other (phase insulation), and to insulate the coil windings from the slots in which they are located (slot insulation).

The slot insulation must withstand the considerable pressures of the winding process and the stresses resulting from normal machine operation. To meet these requirements it has been found necessary to use films that are thicker than are normally required to meet the basic electrical needs but which, nonetheless, occupy valuable space within the slots, thereby limiting the space available for the windings in such slots and at considerable additional expense in insert costs.

In slot insulation applications, the amount of space occupied in the slot by the slot lining insert is critical because of the limitations imposed upon the windings which will fit in these small slots along with the insert itself. In other words, the less space the insert occupies (while still performing the myriad required minimum functions of such an insert, such as insulating and cushioning) the better.

The present invention solves these problems and other problems existent in the prior art by using a corrugated plastic insert as insulation in a dynamoelectric machine. Such corrugated insert is thick enough (thickness prior to corrugating) to withstand the winding and other forces exerted upon it by the coil windings in the slot but still is much thinner than uncorrugated, flat inserts having similar electrical and mechanical properties; still, after corrugating, it occupies no more space in the slot than the uncorrugated thicker insert.

The winding operation presents a heavy load pressure adjacent the surface of the insert inasmuch as it is tightly wound between the slots and about the vertical or side parts of the slot inserts. The inserts, therefore, must be strong enough to withstand these forces or pressures without crushing the corrugations which must remain in substantial unchanged position to serve its proper cushioning function. Alternatively, the coils, grouped together, may be simply inserted into the slots as a unit in lieu of winding. The inserts also must withstand these inserting forces which in this environment can be substantial. In addition to the mechanical properties required of the insert (strength, cushioning, etc.), the insert must provide suitable slot insulation and have many other electrical properties to function properly as insulation in dynamoelectric machines, such as hermetically sealed refrigerator motors, for example.

It has been found that the corrugations of this corrugated plastic insert of proper height provide effective air spaces in the area between the windings and the insert and between the insert and the slot. These relatively small air spaces also provide pneumatic cushioning against mechanical forces which might otherwise damage the core windings or machine. Also, protection is afforded by the resilient deflection of the corrugations themselves. Inasmuch as the plastic material is substantially non-absorbent damage by moisture which might change the electrical properties of the windings is avoided.

The following, then, are among the basic property requirements for a slot liner insert of this type: (1) resists chemical attack, (2) good dielectric strength, (3) electrical stability, (4) good insulating properties, (5) rigidity, (6) good mechanical strength, and (7) cushioning properties.

The corrugated plastic slot lining insert of this invention provides improved cushioning and strength for slot coil windings in a dynamoelectric machine and further provides good thermal insulation, dielectric strength and the other above-mentioned properties while occupying a minimum space in the slot.

DESCRIPTION OF THE PREFERRED EMBODIMENT

Figure 1:
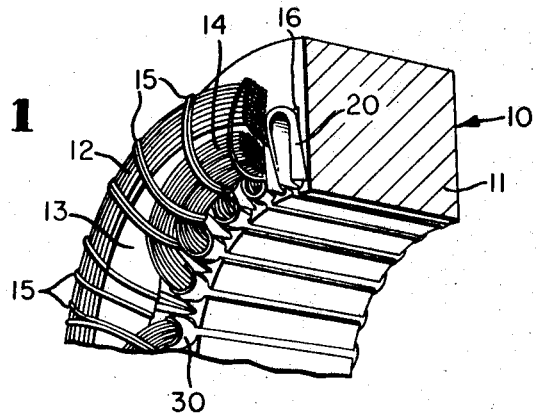
FIG. 1 is a perspective view of a stator core of a dynamoelectric machine, with parts omitted for clarity, showing corrugated plastic slot lining inserts of this invention positioned in slots in the core and showing coil windings wound between the slots and cushioned by the inserts.

Referring to the drawing and FIG. 1 in particular, there is seen a perspective view of a stator core 10 of a dynamoelectric machine showing slot liner inserts 20 of this invention positioned in slots 16 in such core.

The core 10 of the stator is formed by a stackup of metal laminations 11 and the slots 16 are radially disposed around its periphery. The slots 16 have a substantially U-shaped configuration and are of a predetermined width and depth to receive electrical wiring or coil windings 12 and 14 therewithin.

Figure 2:
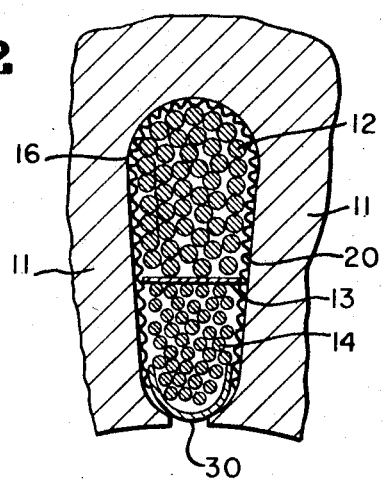
FIG. 2 is a cross-sectional view of a single slot showing an insert positioned therewithin between coil windings and the inner walls of the slot.

The coil windings 12, as best seen in FIGS. 1 and 2, are for running the motor and the coil windings 14 are for starting the motor of the dynamoelectric machine. These windings 12 and 14 are separated by phase separator means 13 and are tied together with cords 15 to form a unitary structure.

The windings 12 and 14 are received in the slots 16 and are wound from slot to slot around the vertical walls of the insert 20 which cushions and insulates the windings 12 and 14 in such slots 16 from the inner surfaces of the slots 16. After the windings are wound between the slots and around the inserts, the windings are covered by insulating wedges 30 which assist in restraining the windings within the slots 16 in a manner known to the art.

It is advantageous, as has been explained, to have the inserts 20 occupy as little space as possible in the slots 16 and to do so without sacrificing the insulating and strength and other required properties of the insert.

The insert 20 of this invention occupies very little space in the slot and this results in more useable space for coils wound in the slots.

The plastic insulating material or insert 20 is quickly insertable in the slot 16 of a magnetic core. The insert 20 is formed from a corrugated blank of proper size to fit the slot 16 along substantially its side wall dimensions and its bottom dimensions, as best seen in FIG. 2. The insert, although formed from a single thickness of plastic insulating material, is able to adequately and properly cushion and insulate the windings in the slot due to its corrugations.

FIG. 2 shows a typical slot 16.

Figure 3:
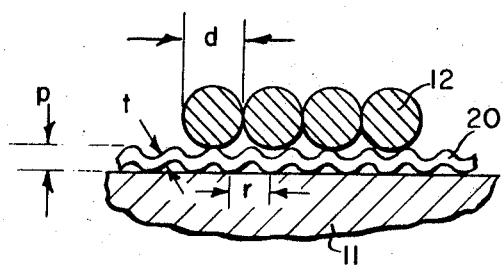
FIG. 3 is a greatly enlarged sectional view of a slot with a slot lining insert positioned therein, similar to FIG. 2 but omitting parts and showing greater detail.

FIG. 3 is a detail of the bottom of the slot 16 shown in FIG. 2. The windings 12 bear upon or are in contact with the corrugations in the insert 20, and are cushioned by the spaces defined by such corrugations. The width $d$ of an individual wire or winding is greater than the repeat distance $r$ between corrugations so as to insure that the windings resiliently contact the crests or portions of the crests of the corrugations, and not the valleys defined by the crests; otherwise, no cushion may be provided for some of the windings and this can lead to failure during the winding or in use.

Slot inserts 20, phase insulation 13, and insulating wedges 30 may all be prepared of corrugated polyester film but it is particularly advantageous to prepare the slot inserts 20 of corrugated plastic film or board, such as polyethylene terephthalate film or board, as will further be explained.

Among the important functional properties sought in machine or motor insulation are the following:

(1) A high mechanical strength.
(2) A reasonable retention of mechanical and electrical properties at elevated temperatures and after relatively long periods of heat aging.
(3) A high degree of chemical inertness toward electrical insulating varnishes.
(4) A low degree of moisture sensitivity.
(5) A moderately high dielectric fatigue and dielectric strength.

Polyethylene terephthalate film or board is outstanding as a dielectric for motor insulation because it possesses the unique combination of properties listed above. The use of this film provides for highly desirable improvements in electric motor performance and design.

The problem with flat polyethylene terephthalate film as an insulating insert for slots in dynamoelectric machines is in order for it to provide proper cushioning requires that it occupy a larger portion of the relatively small slot than it would need to meet the minimum electrical requirements of such insert. By corrugating the film and then using it as the insert, not only is the slot area occupied by the insert kept substantially the same but a much thinner plastic film or board is usable with little or no sacrifice in desired end results.

The relative thickness $t$ of the slot insert 20 of this invention, before corrugating, and its thickness $P$ from corrugation crest to opposed corrugation crest, after corrugating, are critical to the invention. Generally, the thickness P of the insert 20, after corrugating, will be no greater than the thickness of similar known flat inserts giving the desired cushioning and electrical use results. The uncorrugated thickness $t$, then, of the inventive insert is less than the thickness of known flat inserts and, after corrugating, its thickness P measured from crest to opposite crest is no greater than the thickness of these known flat inserts but still functions to serve as well as or better than these known inserts, and at less cost due to its decreased thickness.

The stiffness of a plastic insert in bending varies approximately with the cube of the thickness and directly with the modulus. The required stiffness or rigidity of a given slot lining insert 20 will vary depending upon use and winding practice of the particular manufacturer but in general it must equal or exceed that provided by a 7 mils thick film and may range to 14 mils or more. When corrugated film is used in place of solid film the cube rule must be modified since the stiffness does not increase as quickly as the cube.

Suitable usable films are biaxially oriented heat set films of polyethylene terephthalate with properties similar to those described in Canadian Pat. 599,248 to Fuller and in U.S. Pat. 2,935,859 to Marvin. Other thermoplastic polyesters including polycarbonates may also be used and the film may be unoriented or oriented in one direction and may contain additives.

The relationship of space to volume as well as the repeat distance between corrugations of the insert have been found to have critical limits. Typical examples or explanations will illustrate this wherein "Space-Volume Ratio" $(S/V)$ is the ratio of difference between the film thickness of the insert before corrugation and the average maximum thickness (P) of such insert after corrugation divided by the such corrugated insert thickness (P) and "Repeat Distance" is the distance $(r)$ between successive corrugations of the insert measured as the shortest line between two corrugation crests. In practice it has been found that the stiffness increases by the cube of the corrugated insert thickness multiplied by one minus the space/volume ratio $[P^3(1-s/v)]$. When 5 mils thick film is corrugated to 0.0825 inch corrugated thickness the film can functionally replace a 7 mils thick film and the space volume ratio is 0.394. If film less than 5 mils thick is corrugated, the corrugations are crushed in winding.

In order to provide the cushioning necessary to absorb the applied forces, still providing other desired results, a minimum space/volume ratio of about 0.2 is required. When the ratio falls below 0.2 there is essentially no difference in compressive properties over uncorrugated film and the cut through resistance is diminished. When the space/volume ratio exceeds 0.60 there is no gain in cushioning and the extra space is no longer available for the windings.

The preferred film for slot inserts is 7.5 mils to 12 mils initial material thickness corrugated to a space volume ratio of 0.35 to 0.45. The preferred film for phase insulation is 5 mils to 7.5 mils thick. It is preferred to use a cuffed insert as it is more readily retained in the slot but inserts without cuffs, or with double cuffs, will work adequately.

It is, therefore, seen that by using the novel corrugated plastic slot lining insert of this invention results in improved performance in dynamoelectric machines.

What is claimed is:

1. In a dynamoelectric machine including a core having means defining a plurality of slots therein for receiving coil windings, the improvement comprising:
a slot lining insert being positioned within each said slot and in substantially abutting contact with parts of the interior surface of said slots, said insert being substantially U-shaped and including bottom parts and side parts, said coil windings being received in said slots and at least some of the outermost coil windings being in abutting contact with parts of the inner surface of the bottom parts and side parts of said insert, said insert being corrugated and of heavy plastic material.

2. In the dynamoelectric machine of claim 1, said slot lining insert being at least 5 mils thick prior to corrugating and after corrugating having a space to volume ratio of between 0.20 to 0.60 and the corrugation repeat distance being less than the width of an individual coil winding.

3. In the dynamoelectric machine of claim 1, said slot lining insert being of polyethylene terephthalate film.

References Cited

UNITED STATES PATENTS

| | | | |
|---|---|---|---|
| 2,340,905 | 2/1944 | Sigmund et al. | 310—88 |
| 2,935,859 | 5/1960 | Marvin | 310—215 X |
| 3,210,583 | 10/1965 | Profitt et al. | 310—215 |
| 3,219,857 | 11/1965 | Fisher | 310—71 |
| 3,334,255 | 8/1967 | Peters | 310—215 |

WARREN E. RAY, Primary Examiner